: US005511809A

United States Patent [19]
Sagi

[11] Patent Number: 5,511,809
[45] Date of Patent: Apr. 30, 1996

[54] PEDAL-POWERED FOUR-WHEEL VEHICLE

[76] Inventor: David P. Sagi, 18124 Sandringham Ct., Northridge, Calif. 91326

[21] Appl. No.: 265,799

[22] Filed: Jun. 27, 1994

[51] Int. Cl.[6] ................................................ B62K 13/06
[52] U.S. Cl. ........................ 280/209; 280/231; 280/259; 280/267; 280/282
[58] Field of Search ................................ 280/209, 231, 280/7.1, 7.15, 7.16, 230, 259, 263, 267, 282

[56] References Cited

U.S. PATENT DOCUMENTS

| | | | |
|---|---|---|---|
| 588,361 | 8/1897 | Shurz | 280/231 |
| 3,592,486 | 7/1971 | Fox | 280/209 |
| 3,865,401 | 2/1975 | Kingsly | 280/209 |
| 3,870,338 | 3/1975 | Holub | 280/209 |
| 3,938,827 | 2/1976 | Johnson | 280/209 |
| 4,227,589 | 10/1980 | Chika | 280/209 X |
| 4,288,089 | 9/1981 | Thiessen | 280/209 |
| 4,290,620 | 9/1981 | Chika | 280/209 |
| 4,834,410 | 5/1989 | Parker | 280/231 X |

FOREIGN PATENT DOCUMENTS

| | | |
|---|---|---|
| 2592356 | 12/1985 | France . |
| 2603858 | 9/1986 | France . |
| 0025398 | of 1899 | United Kingdom ................ 280/231 |
| 0188345 | 3/1924 | United Kingdom . |
| 1078535 | 8/1967 | United Kingdom . |

*Primary Examiner*—Margaret A. Focarino
*Assistant Examiner*—F. Zeender
*Attorney, Agent, or Firm*—Thomas I. Rozsa; Tony D. Chen

[57] ABSTRACT

The present invention is a pedal-powered two-rider four-wheel vehicle which has a general configuration of two bicycles attached in a side-by-side relationship. The four-wheel vehicle includes four mechanisms which are utilized to construct the present invention: (a) a "king-pin" front-wheel steering system; (b) a differential axle; (c) an intermediate driving shaft; and (d) a unified brake system.

39 Claims, 7 Drawing Sheets

PEDAL-POWERED FOUR-WHEEL VEHICLE

BACKGROUND OF THE INVENTION

1. Field of The Invention

The present invention relates to the field of pedal-powered vehicles. More particularly, the present invention relates to the field of parallel bicycles.

2. Description of The Prior Art

It has been a long-time popular hobby for people to ride their bicycles. One way of riding their bicycles is in a side-by-side arrangement so that they can easily talk face-to-face without yelling at each other. There are many prior art patents to interconnect two bicycle members in a side-by-side relationship. None has been very successful because one of the problems encountered is that the rear wheels of the two side-by-side bicycle members rotate at different speeds, depending on how fast each rider is pedalling. This makes it difficult to maneuver the two bicycle members when turning at a corner.

The following eight (8) prior art patents were uncovered in the pertinent field of the present invention.

1. U.S. Pat. No. 3,592,486 issued to Fox on Jul. 13, 1971 for "Apparatus For Connecting Two Bicycles In Side-By-Side Relation" (hereafter "the Fox Patent").

2. U.S. Pat. No. 3,870,338 issued to Holub on Mar. 11, 1975 for "Dual Tricycle Kit" (hereafter "the Holub Patent").

3. U.S. Pat. No. 4,227,589 issued to Chika on Oct. 14, 1980 for "Combined Engine And Pedal Powered Vehicles" (hereafter "the Chika Patent").

4. U.S. Pat. No. 4,288,089 issued to Thiessen on Sep. 8, 1981 for "Attachment Apparatus For Side-By-Side Bicycles" (hereafter "the Thiessen Patent").

5. British Patent No. 188,345 issued to Jouve on Mar. 6, 1924 for "Improvements In And Relating To Cycles And Automobiles" (hereafter "the Jouve Patent").

6. British Patent No. 1,078,535 issued to Muller on Aug. 9, 1967 for "Improvements In And Relating To Motor Vehicles" (hereafter "the Muller Patent").

7. French Patent No. 2,592,356 for "Manual Pedal Powered Vehicle—Has shafts Driven By Pedals Connected To Rear Wheels Via Reduction Gears" (hereafter "the '356 French Patent").

8. French Patent No. 2,603,858 for "Pedal Operated Vehicle For Two Riders—Has Side By Side Seats And Pedals With Connecting Rods For Crank Mechanism With Chain Drive" (hereafter the "'858 French Patent").

The Holub Patent discloses a dual tricycle kit. The kit converts two standard bicycle frames into a tricycle which will seat the occupants side-by-side.

The Fox Patent discloses an apparatus for connecting two bicycles in side-by-side relationship. It includes a steering bar which is mounted to steering plates which are provided near one end with a suitable opening to permit them to be mounted on the stems of the front wheel forks.

The Chika Patent discloses a combined engine and pedal powered vehicles. It includes two bicycles which are interconnected into side-by-side relationship producing a four-wheel vehicle operable and propellable by either one or both of its two riders, while the transverse connecting members offer additional carrying capacity for people and cargo. The side-by-side bicycles utilize various means of engine power assists which are integrated into the combined structure thus allowing the use of pedal power alone, the engine power alone, or any combination of both, therefore making the coupled vehicle very useful for transportation. The Chika Patent also utilizes a king-pin with track-arm and track-rod connection of the front wheels of the two bicycles to provided efficient steering from either bicycle.

The Thiessen Patent discloses an attachment apparatus for side-by-side bicycles. The attachment apparatus includes a main support coupling means to interconnect the bicycle members and a steering coordinator means to interconnect the steering mechanism of each bicycle member.

The Muller Patent discloses a four-wheel motor vehicle for carrying the driver and which will take up far less space on the road than the average car.

The Jouve Patent discloses a four wheeled vehicle that may be driven either by the motor or by the cycle pedals or by both and may be steered from either handle bars and when taken apart the cycles may be used as individual cycles.

The '356 French Patent, as disclosed by the abstract and the figure shows a manual pedal powered vehicle. The transmission is connected to a shaft which is driven by pedals to a drive input shaft for a rear wheel. A second transmission path connects to another pedal shaft for another user to an input shaft of a second driven rear wheel.

The '858 French Patent, as disclosed by the abstract and the figure shows a pedal operated vehicle for two riders. A frame is supported by two wheels at the rear and a single wheel at the front, with a steering wheel attached. The frame is formed from three longitudinal tubes and cross tubes at the rear and at the front. The pedals are connected by connecting rods to cranks on a crank wheel connected by a chain to the rear axle.

None of the prior art has disclosed a differential axle for the rear wheels and an intermediate driving shaft mechanism for the two bicycle members in a side-by-side arrangement. Therefore, it is desirable to design a mechanism where the novelty would be on the differential axle for the rear wheels and the intermediate driving shaft.

SUMMARY OF THE INVENTION

The present invention is a pedal-powered two-rider four-wheel vehicle. The present invention is a novel and unique pair of parallel bicycles which are configured in a side-by-side arrangement. The side-by-side arrangement has been made possible by incorporating a rear axle special transmission into two ordinary bicycles, special brake and steering mechanism. The unique features of the present invention include an intermediate driving shaft and a differential axle.

The concept of the present invention is to have two bicycles attached in a side-by-side relationship. The present invention includes four major mechanisms which are utilized to construct the two bicycles in the side-by-side relationship: (a) a "king-pin" front-wheel steering system; (b) a differential axle for the rear wheels; (c) an intermediate driving shaft; and (d) a unified brake system.

First, the steering posts of the two bicycles are attached together by a tie-rod and operable only by one rider for steering purposes. The other rider will only hold a "dummy" handlebar. This front wheel steering system employs a so-called "king-pin" steering system (the principle of which has been widely applied in automobile steering wheel systems).

Second, the rear wheels of the two bicycles are driven by a differential axle through their respective half-axle. This makes it possible for the two rear wheels of the present invention to rotate at different speeds when the two bicycles turn at a corner.

Third, the intermediate driving shaft is attached between the rear wheels of the two bicycles. Each end of the intermediate driving shaft has an optional speed control hub and a freewheel attached to the speed control hub. Alternatively, it can be a one piece unit which contains the speed control hub and the freewheel to function as a freewheeling hub. Unlike normal bicycles where the pedalling power is transmitted via the chain to the rear-wheel axle, in the present invention the pedalling power of each bicycle is transmitted via its respective chain to the respective freewheeling hub. The rotational power transmitted to the two freewheeling hubs together drives the intermediate driving shaft, which in turn drives the propelling gear of the differential axle via an additional chain. What happens is that the individual pedal power of each peddler is summed and the total power is then transmitted to this intermediate driving shaft which then transmits the summed power to the differential axle which in turn evenly distributes the power to the rear wheel of each of the two bicycles. In this way, if one rider is peddling faster or slower, it does not matter because their peddling powers are joined together and then evenly distributed to the two attached bicycles.

Fourth, the unified brake system enables the driver of the four-wheel vehicle to apply braking to both bicycles. For example, when the driver applies his or her rear-wheel brake, the brake systems on both rear wheels of the two bicycles are actuated so that the two bicycles are evenly braked.

It has been discovered, according to the present invention, that by having the rear wheels of the two bicycles driven by a differential axle through their respective half-axle, then the two rear wheels of the two bicycles can be rotated at different speeds and thereby making it possible for the two bicycles to turn a corner.

It has further been discovered, according to the present invention, that by having an intermediate driving shaft which is attached between the rear wheels of the two bicycles, then the pedalling power of each bicycle is transmitted via its respective chain to the respective freewheeling hub and thereby the rotational power transmitted to the two freewheeling hubs together drives the intermediate driving shaft, which in turn drives the propelling gear of the differential axle via an additional chain.

It is therefore an object of the present invention to provide an arrangement of bicycles whereby two persons may ride side-by-side in complete safety without liability of turning the bicycles over or becoming involved in accidents when two riders simultaneously steer the two bicycles in diverse direction, by immobilizing the handlebars of one of the bicycles, and therefore permit riding over trails, etc., by two persons, one of whom may be incapable for any reason of operating a bicycle, and further to connect the two bicycles rigidly in side-by-side relationship to ensure their operation and movement in unison.

It is also an object of the present invention to provide a differential axle, where the rear wheels of the two bicycles are driven by the differential axle through their respective half-axle so that the two rear wheels of the two bicycles can rotate at different speeds when the two bicycles turn at a corner.

It is a further object of the present invention to provide an intermediate driving shaft which is attached between the rear wheels of the two bicycles, so that the pedalling power of each bicycle is transmitted via its respective chain to the respective freewheeling hub and thereby the rotational power transmitted to the two freewheeling hubs together drives the intermediate driving shaft, which in turn drives the propelling gear of the differential axle via an additional chain. The individual pedal power of each peddler is summed and the total power is then transmitted to the intermediate driving shaft which then transmits the summed power to the differential which in turn evenly distributes the power to the rear wheel of each of the two bicycles. In this way, if one rider is peddling faster or slower, it does not matter because the two sums are joined together and then evenly distributed to the two attached bicycles.

It is an additional object of the present invention to provide two bicycles with a steering system which employs a "king-pin" steering system, where the steering posts of the two bicycles are attached together by a tie-rod and operable only by one rider for steering purposes.

It is a further object of the present invention to provide two bicycles with a unified brake system which enables the driver of the two bicycles to apply braking to both bicycles.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
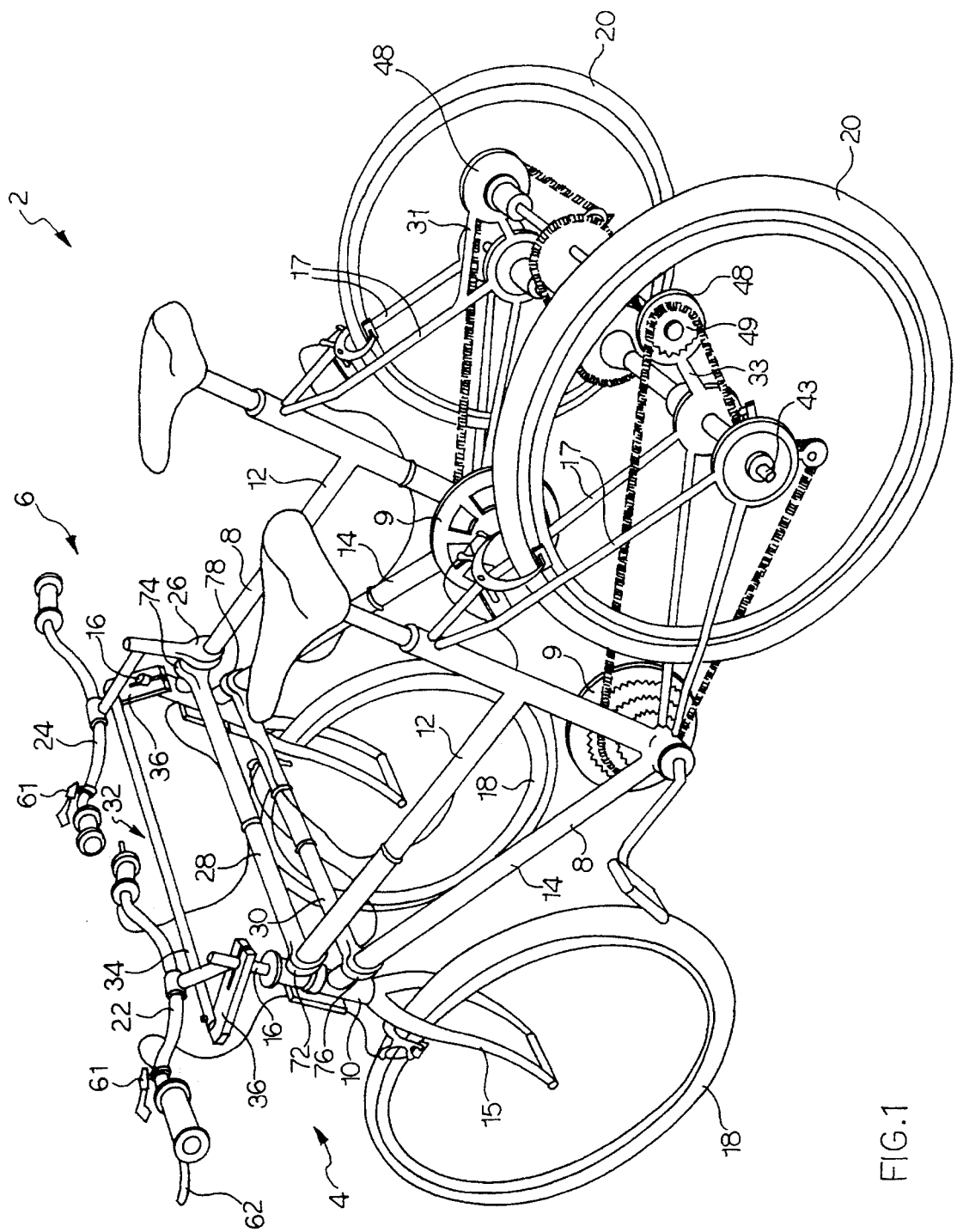
FIG. 1 is a rear perspective view of the preferred embodiment of the present invention four-wheel vehicle.
Figure 2:
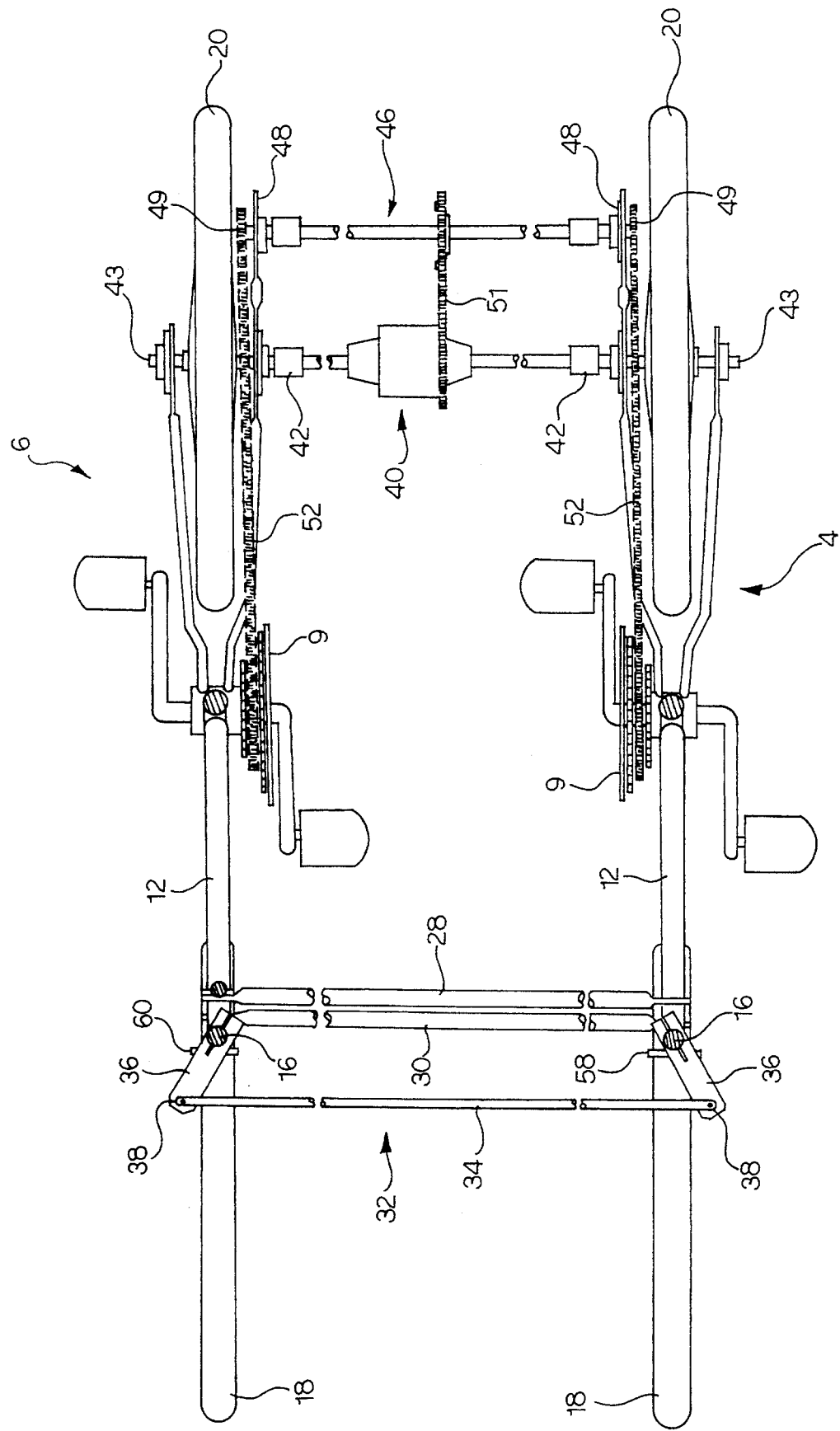
FIG. 2 is a partial top plan view of the four-wheel vehicle.

Referring to FIGS. 1 and 2, there is shown at 2 the preferred embodiment of the present invention pedal-powered two-rider four-wheel vehicle. The present invention has a general configuration of two bicycles attached in a side-by-side relationship. The construction of the four-wheel vehicle 2 consists of four unique mechanisms: (a) a "kingpin" front-wheel steering system 32; (b) a differential axle 40 for the rear wheel shafts; (c) an intermediate driving shaft or speed control shaft 46; and (d) a unified brake system.

The speed control can be accomplished on the front wheels or the rear wheels or both. The four-wheel vehicle 2 includes a left side two-wheel bicycle 4 and a right side two-wheel bicycle 6. Each bicycle has a frame member 8 which includes a chain wheel 9, a head tube 10, an incline crossbar 12, an incline down tube 14, a steering post 16, a front fork 15, a stay seat 17, a front wheel 18 and a rear wheel 20. The left side bicycle 4 has a handlebar 22 which is securely attached to the steering post 16. The steering post 16 is securely connected by inserting it into the head tube 10 of the left side bicycle 4.

The right side bicycle 6 has a dummy handlebar 24. The dummy handlebar 24 has a clamp end 26 which is clamped to the incline crossbar 12 of the right side bicycle 6 for balancing a passenger in the four-wheel vehicle 2.

Figure 4:
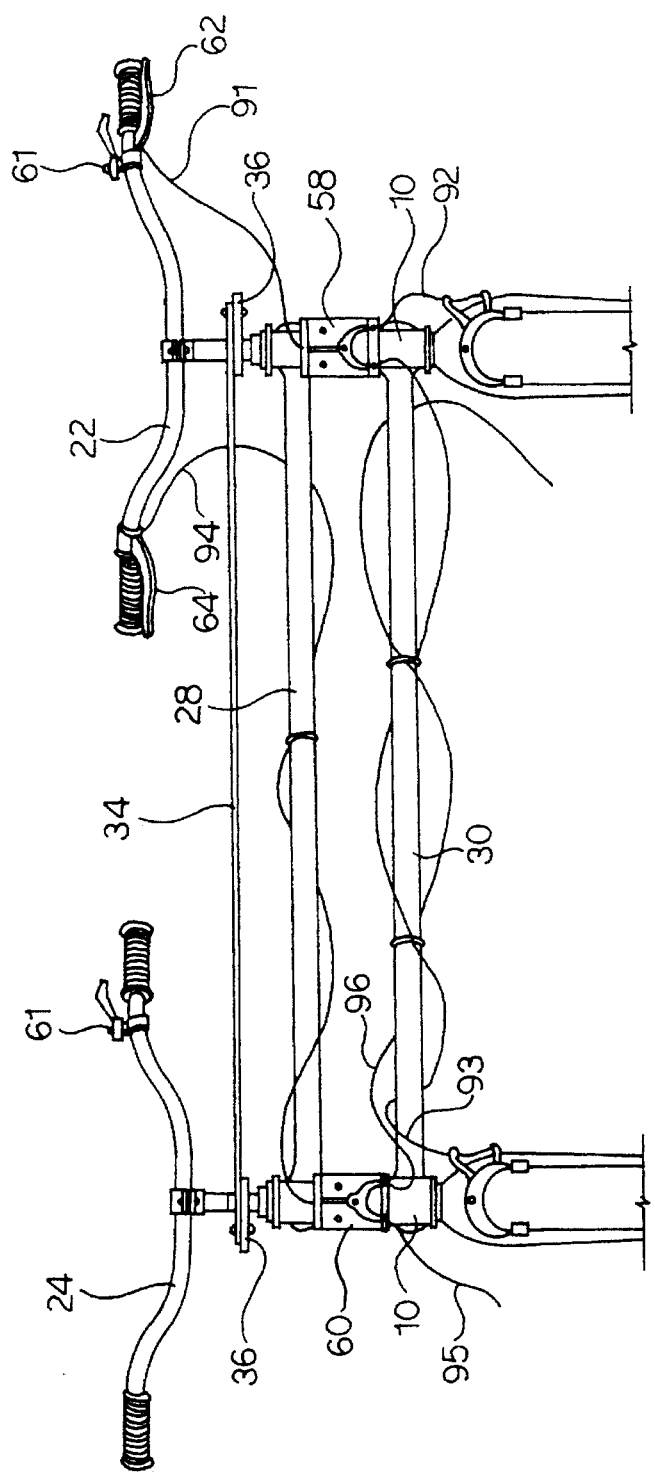
FIG. 4 is a partial front elevational view of the four-wheel vehicle showing the unified braking system.

Referring to FIGS. 1, 2 and 4, there is shown the first mechanism which is the front-wheel steering system 32. It includes an elongated horizontal tie rod 34 with two opposite ends 38. Each end 38 of the tie rod 34 is coupled to a mounting plate 36 which is clamped respectively to the steering posts 16 of the left and right bicycles 4 and 6. The steering system 32 can be operable only by a driver on the left side bicycle 4. The other rider or passenger will only hold the dummy handlebar 24 for balancing on the right side bicycle 6. This front wheel steering system 32 is a "kingpin" steering system which ensures that when the four-wheel vehicle is making a turn, the two front wheels are following two respective concentric paths.

Figure 3:
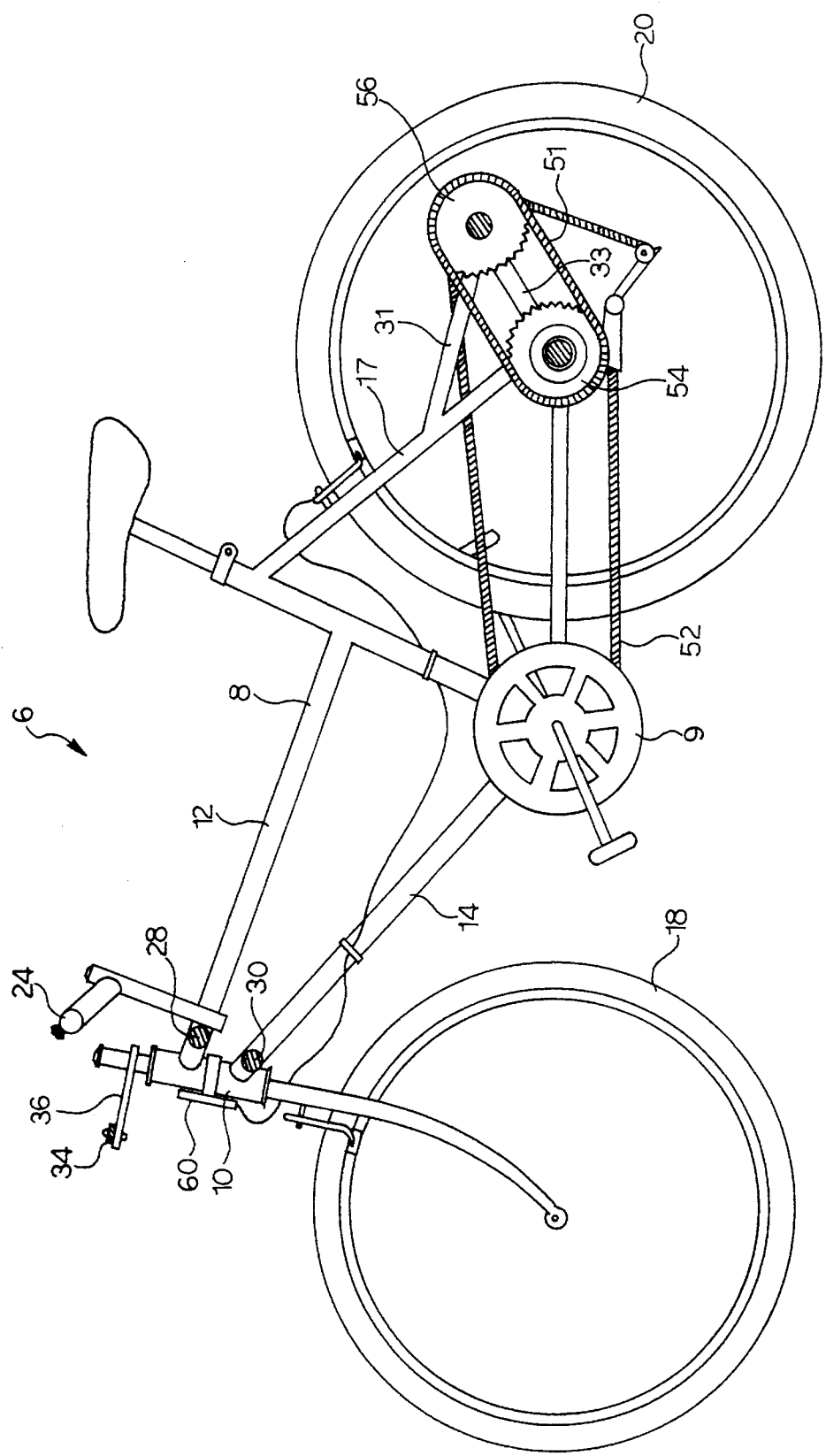
FIG. 3 is a cross-sectional view of one of the two bicycles showing the differential axle and the intermediate driving shaft.

FIG. 2 shows a partial top plan view of the four-wheel vehicle 2, and FIG. 3 shows a cross-sectional side view of the two sprockets 54 and 56 of the differential axle and the intermediate driving shaft respectively. Referring to FIGS. 2 and 3, there is shown the second mechanism which is the differential axle 40. The differential axle 40 used in the present invention is an off the shelf component, such as model number 100-007A manufactured by the Tecumseh Products Company and the internal workings will not be described in great detail. The rear wheels 20 of the two bicycles. 4 and 6 are driven by the differential axle 40 through their respective half-axles 42. This makes it possible for the two rear wheels 20 of the four-wheel vehicle 2 to rotate at different speeds when the four-wheel vehicle 2 turns at a corner.

The differential axle 40 is mounted between the two bicycles 4 and 6, and coupled to the two rear wheel shafts 43. The sprocket 54 is mounted to the differential axle 40 and is located at a central location.

Referring again to FIGS. 2 and 3, there is shown the third mechanism which is the intermediate driving shaft 46. It is mounted between the rear wheels 20 of the two bicycles 4 and 6, and located parallel and adjacent to the differential axle 40. The intermediated driving shaft 46 further has two opposite ends wherein each end has a speed control hub 48 which is optional and is attached to a freewheel 49 or it can be a unity freewheeling hub 49. The freewheeling hubs 49 are mounted above a location adjacent to the rear wheel shafts 43 and supported by two support shafts 31, 33 (see FIG. 1) extending from the stay seats 17 of the two bicycles 4 and 6. Unlike conventional bicycles where the pedalling power is transmitted via the drive chain to the rear-wheel axle, in the four-wheel vehicle 2, the pedalling power of each bicycle 4, 6 is transmitted via its respective gear control chain 52 to the respective freewheeling hub 49. The rotational power transmitted to the two freewheeling hubs 49 together drives the intermediate driving shaft 46, which in turn drives the propelling gear of the differential axle 40 via a drive chain 51 which links the sprockets 54 and 56 of the differential axle 40 and the intermediate driving shaft 46 respectively. What will happen is that the individual pedal power of each rider is summed and the total power is then transmitted to the intermediate driving shaft 46 which then transmits the summed power to the differential axle 40 which in turn evenly distributes the power to the rear wheels 20 of each of the two bicycles 4 and 6. In this way, if one rider is peddling faster or slower, it does not matter because their peddling powers are joined together and then evenly distributed to the two bicycles 4 and 6.

Referring to FIG. 4, there is shown a front view of the fourth mechanism which is the unified brake system. The unified brake system includes a front brake joint member 58 and a rear brake joint member 60. By way of example only, when the driver applies his or her rear-wheel brake, the rear brakes on both the rear wheels 20 of the four-wheel vehicle 2 are actuated so that the four-wheel vehicle 2 is evenly braked and does not cause any tip over or spin out. The front brake joint member 58 is mounted on the head tube 10 of the left side bicycle 4. The front joint member 58 is coupled to both the front brakes of the four-wheel vehicle 2 through cables 92, 93 and is actuated by a left control brake lever 62 through cable 91. The rear joint member 60 is coupled to both the rear brakes of the four-wheel vehicle 2 through cables 95, 96 and is actuated by a right control brake lever 64 through cable 94. The control brake levers 62 and 64 are conveniently mounted to the handlebar 22 on the left side of the four-wheel vehicle 2. The unified brake system can also be activated through dual barrel brake levers, eliminating the need for front and rear brake joint members 58 and 60. The dual barrel brake lever is available through the Quality Bicycle Products, such as model number SS-7 MTB.

Referring to FIGS. 1, 2, 4 and 5, there is shown an elongated upper front horizontal bar 28 which is located adjacent to and parallel to an elongated lower front horizontal bar 30. Two opposite clamp members 72 and 74 are provided at each end of the upper horizontal bar 28 for clamping to the incline crossbars 12. Two opposite clamp members 76 and 78 are also provided to the lower horizontal bar 30 for clamping to the incline down tubes 14. Both of these horizontal bars 28 and 30 are utilized for rigidly securing the stabilizing the front of the two bicycles 4 and 6 together in a side-by-side relationship.

Figure 5:
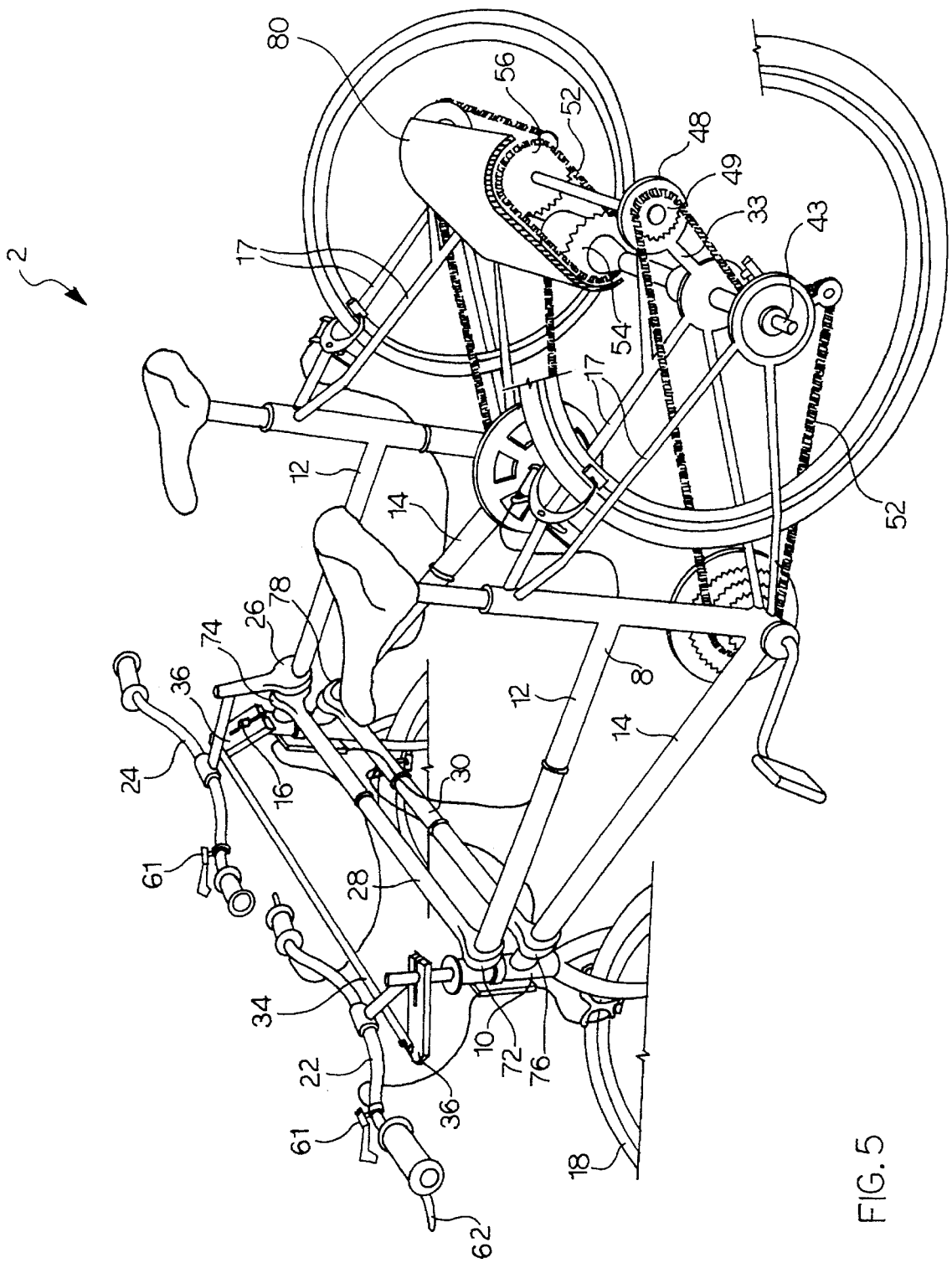
FIG. 5 is a partial perspective view showing the linkage between the differential axle and the intermediate driving shaft and a cover member covering both the differential axle and the intermediate driving shaft.

Referring to FIG. 5, there is shown a partial rear perspective view of the four-wheel vehicle 2. An elongated cover member 80 is mounted between the two bicycles 4 and 6 for covering the differential axle 40 and the intermediate driving shaft 46 so that debris will not get entangled with the drive chain 51. The cover member 80 is further utilized to secure and stabilize the rear of the two bicycles 4 and 6 together in the side-by-side relationship.

Figure 6:
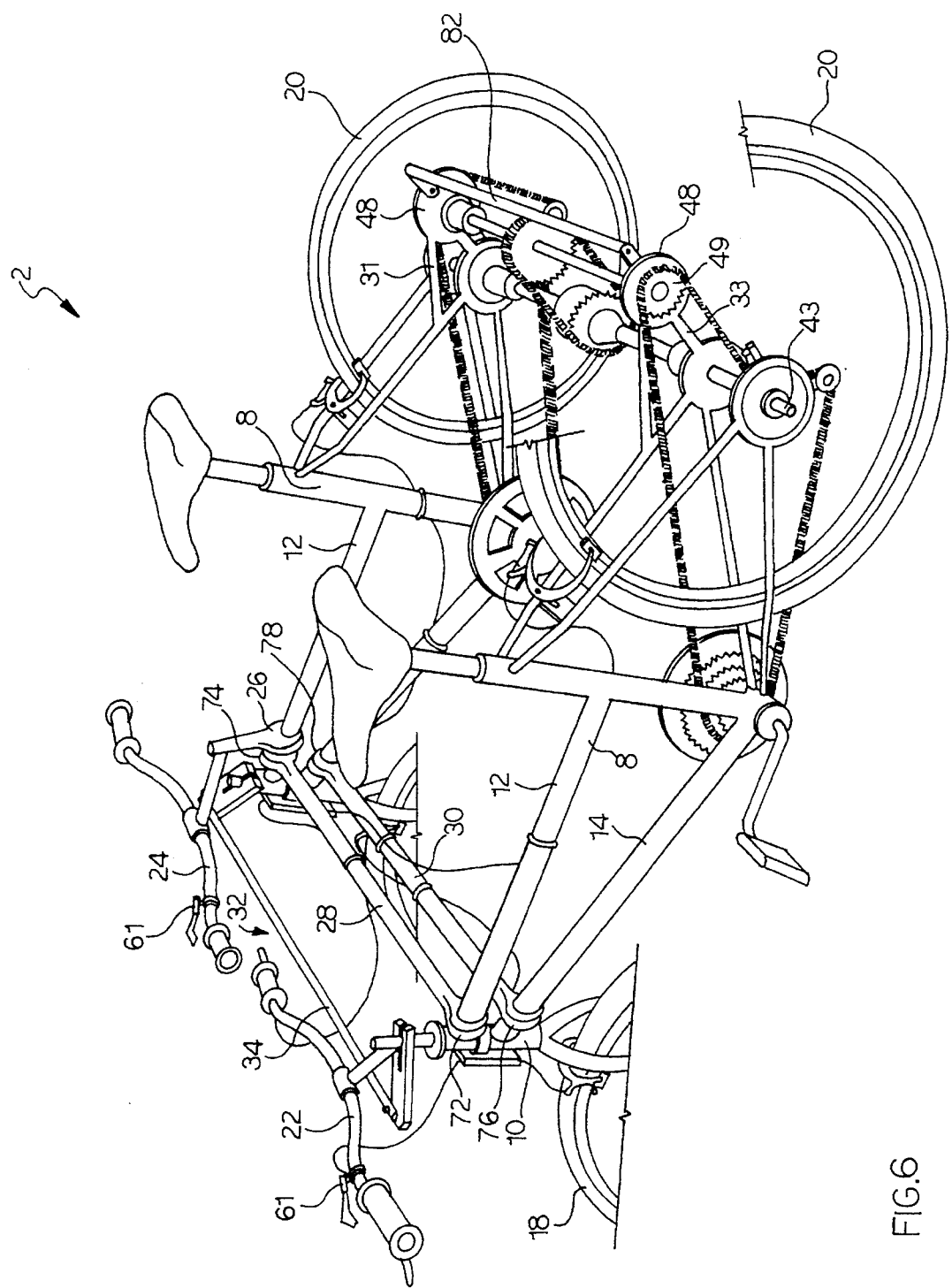
FIG. 6 is a partial perspective view showing an alternative embodiment of a rear support bar securing the two bicycles together.

Referring to FIG. 6, there is shown a partial rear perspective view of an alternative embodiment of the present invention four-wheel vehicle 2. Since it assembles and functions the same as previously described above except that an elongated rear support bar means 82 is substituted for the elongated cover member 80 shown in FIG. 5, and the description thereof will not be repeated and only the modified components will be described in detail.

The elongated rear support bar means 82 is mounted between the rear wheels 20 of the four-wheel vehicle 2 and attached to the speed control hubs 48 at opposite ends. The rear support bar means 82 is utilized for rigidly securing the stabilizing the rear of the two bicycles 4 and 6 together in a side-by-side relationship.

What is unique about the four-wheel vehicle 2 is that the right side bicycle 6 is a mirror image of the left side bicycle 4. Actually, the left side bicycle 4 is a conventional bicycle with some modification by the present invention and the right side bicycle 6 components beginning from the chain wheel 9 to the rear of the bicycle 6 are a mirror image of the left side bicycle 4.

By way of example only, the dimensions of the four-wheel vehicle 2 for each bicycle 4 and 6 includes a 19" frame, a 26" wheel diameter and a 42" wheel base. The width of the four-wheel vehicle 2 is approximately 24" to 30". Each freewheeling hub 49 has seventeen teeth (17 T). Each bicycle has three speed control chain wheels 9 wherein each one has thirty teeth (30T), thirty-nine teeth (39T), and fifty teeth (50T) respectively. It will be appreciated that these dimensions and teeth described above are merely one illustrative embodiment and can include many other comparable sets of dimensions and teeth.

The present invention conforms to conventional forms of manufacture and is easy to use. By way of example only, the bicycles 4 and 6 can be made of aluminum, steel, titanium, other metal alloys or graphite material.

It will be appreciated that all other components in the present invention are conventional parts and will not be described since they are well known in the art such as the speed control shifters 61.

Figure 7:
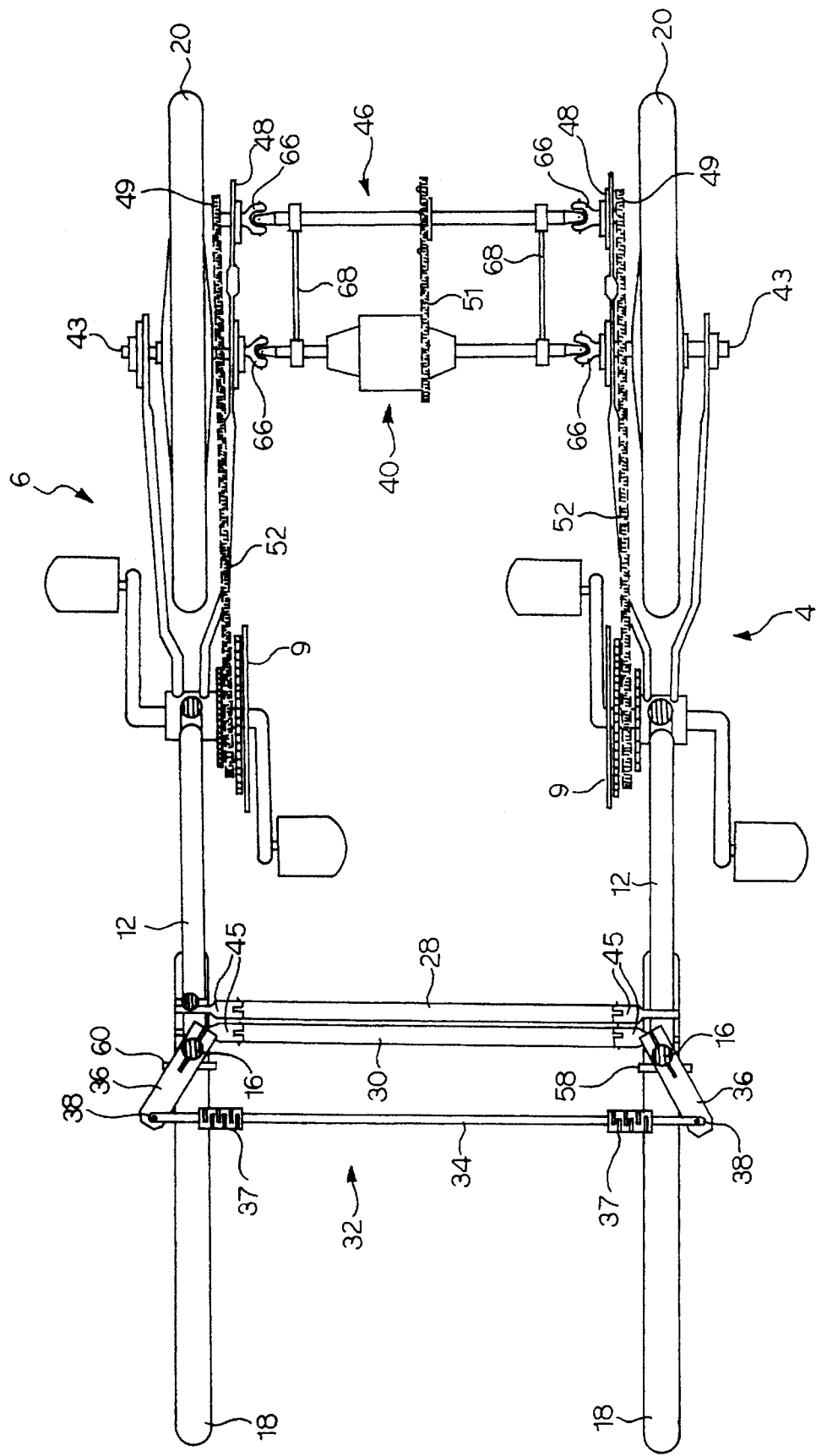
FIG. 7 is a partial top plan view of the four-wheel vehicle showing another alternative embodiment of flexible, hinge and universal joints connecting the two bicycles in a side-by-side arrangement.

Referring to FIG. 7, there is shown a partial top plan view of another alternative embodiment of the present invention four-wheel vehicle 2. It assembles and functions the same as previously described above except that the two bicycles 4 and 6 are interconnected together by flexible, hinge and universal couplings. Since these couplings are well known in the art, there description will not be described in great detail.

Two flexible couplings 37 are connected with one flexible coupling at opposite ends of the elongated horizontal tie rod 34. The flexible coupling 37 can be aluminum, rubber, leather, steel springs, or some other flexible material which allows small amounts of parallel and/or angular movement of the tie rod 34, in addition to absorbing impact due to irregularities in the motion of the tie rod 34.

There are two hinge couplings 45 connected with one hinge coupling at opposite ends of the elongated upper front horizontal bar 28. There are also two hinge couplings 45 with one hinge coupling connected at opposite ends of the lower front horizontal bar 30. These hinge couplings 45 allow for up/down angular movement of the two bicycles 4 and 6.

There are two universal couplings 66 which are connected with one universal coupling at opposite ends of the differential axle 40 and coupled to the two rear wheel shafts 43. There are also two universal couplings 66 with one universal coupling each connected at opposite ends of the intermediate driving shaft 46 and coupled to the freewheeling hubs 49. These universal couplings 66 are used for the connection of the two ends of the differential axle 40 and the intermediate driving shaft 46 that are set at an angle to each other and which angle can be varied while the differential axle 40 and the intermediate driving shaft 46 are rotating. There are two adjustable spacers 68 which are located opposite to each other and include bearings for allowing the bearings to spread to impose some tension on the chain 51 which is coupled to the two sprockets on the differential axle 40 and the intermediate driving shaft 46.

It will be appreciated these couplings are not limited to the above description. It is emphasized that while the flexible, hinge and universal couplings 37, 45 and 66 respectively are the alternative embodiment, it is also within the spirit and scope of the present invention to have different types of couplings incorporated into the four-wheel vehicle 2.

Defined in detail, the present invention is a pedal-powered four-wheel vehicle, comprising: (a) a left side two-wheel bicycle and a right side two-wheel bicycle attached in a side-by-side relationship, each bicycle having a frame member including a chain wheel, a head tube, an incline crossbar, an incline down tube, a steering post, a front fork for attaching to a front wheel and a stay seat for attaching to a rear wheel; (b) a handlebar securely attached to said steering post of said left side bicycle for steering said four-wheel vehicle; (c) a dummy handlebar clamped on said incline crossbar of said right side bicycle; (d) an elongated upper front horizontal bar and an elongated lower front horizontal bar located adjacent and parallel to each other and respectively clamped between said incline crossbars and said incline down tubes of said left and right side bicycles for rigidly securing and stabilizing said left and right side bicycles together; (e) a steering system having an elongated horizontal tie rod with two opposite ends, each coupled to a mounting plate which is clamped to a respective one of said steering posts of said left and right side bicycles for jointly operating both said steering posts; (f) a differential axle mounted between said left and right side bicycles and having a central sprocket and two opposite ends which are coupled to rear wheel shafts of said left and right side bicycles through respective half-axles so that said rear wheels can rotate at different speeds; (g) an intermediate driving shaft mounted between said rear wheels of said left and right bicycles and located parallel and adjacent to said differential axle, the intermediated driving shaft having a central sprocket and two opposite ends, each end having a freewheel affixed to a speed control hub, where each speed control hub is supported by two support shafts extending from a respective one of said stay seats of said left and right side bicycles; (h) two gear control chains each linking said chain wheel and said freewheel of a respective one of said left and right bicycles, where the pedalling power of said left and right side bicycles are transmitted by its respective gear control chains to said intermediate driving shaft through said freewheels respectively; (i) a drive chain linking said sprocket of said differential axle and said sprocket of said intermediate driving shaft, where the rotational power transmitted through said freewheels together drives said intermediate driving shaft, which in turn drives a propelling gear of said differential axle; (j) a unified braking system for simultaneously applying brakes on both said front wheels or both said rear wheels or all wheels of said left and right side bicycles so that said left and right side bicycles can be evenly braked to stop said four-wheel vehicle; and (k) an elongated cover member mounted between said left and right side bicycles for covering said differential axle and said intermediated driving shaft and further securing and stabilizing said left and right side bicycles together; (l) whereby each individual pedal power is summed together and the total power is then transmitted to said intermediate driving shaft, which then transmits the summed power to said differential axle, which in turn evenly distributes the power to said rear wheels of said left and right side bicycles.

Defined broadly, the present invention is a pedal-powered four-wheel vehicle, comprising; (a) a first side bicycle and a second side bicycle attached in a side-by-side relationship, each bicycle having a frame member including a chain wheel, a crossbar, a steering post, a front fork for attaching a front wheel and a stay seat for attaching a rear wheel; (b) a handlebar securely attached to said steering post of said first side bicycle for steering said four-wheel vehicle; (c) a dummy handlebar clamped to said crossbar of said second side bicycle; (d) at least one front horizontal bar clamped to said crossbars of said first and second side bicycles for rigidly securing and stabilizing said first and second side bicycles together; (e) a steering system including a horizontal tie rod with two opposite ends, each coupled to a mounting plate which is clamped to a respective one of said steering posts of said first and second side bicycles for jointly operating both said steering posts; (f) a differential axle mounted between said first and second side bicycles and having a sprocket and two opposite ends which are coupled to rear wheel shafts of said first and second side bicycles through respective half-axles so that said rear wheels can rotate at different speeds; (g) an intermediate driving shaft mounted between said rear wheels of said first and second bicycles and located parallel and adjacent to said differential axle, the intermediated driving shaft having a sprocket and two opposite ends, each end having a freewheeling hub, where each freewheeling hub is supported by two support shafts extending from a respective one of said stay seats of said first and second side bicycles; (h) two gear control chains each linking said chain wheel and said freewheeling hub of a respective one of said first and second side bicycles, where the pedalling power of said first and second side bicycles are transmitted by its respective gear control chains to said intermediate driving shaft through said freewheeling hubs respectively; (i) a drive chain linking said sprocket of said differential axle and said sprocket of said intermediate driving shaft, where the rotational power transmitted though said freewheeling hubs together drives said intermediate driving shaft, which in turn drives a propelling gear of said differential axle; (j) a unified braking system for simultaneously applying brakes on both said front wheels or both said rear wheels or all wheels of said first and second side bicycles so that said first and second side bicycles can be evenly braked to stop said four-wheel vehicle; and (k) means for securing and stabilizing the rears of said first and second side bicycles together; (l) whereby each individual pedal power is summed together and the total power is then transmitted to said intermediate driving shaft, which then transmits the summed power to said differential axle, which in turn evenly distributes the power to said rear wheels of said first and second side bicycles.

Defined more broadly, the present invention is a pedal-powered four-wheel, comprising; (a) a first side bicycle and a second side bicycle attached in a side-by-side relationship, each bicycle having a frame member including a chain wheel, a crossbar, a steering post, a front fork for attaching a front wheel and a stay seat for attaching a rear wheel; (b) a handlebar securely attached to said steering post of said first side bicycle for steering said four-wheel vehicle; (c) a dummy handlebar clamped to said crossbar of said second side bicycle; (d) at least one front horizontal bar clamped to said crossbars of said first and second side bicycles for rigidly securing and stabilizing said first and second side bicycles together; (e) a differential axle mounted between said first and second side bicycles and having a sprocket and two opposite ends which are coupled to rear wheel shafts of said first and second side bicycles through respective half-axles so that said rear wheels can rotate at different speeds; (f) an intermediate driving shaft mounted between said rear wheels of said first and second bicycles and located parallel and adjacent to said differential axle, the intermediate driving shaft having a sprocket and two opposite ends, each end having a freewheeling hub, where each freewheeling hub is supported by two support shafts extending from a respective one of said stay seats of said first and second side bicycles; (g) two gear control chains each linking said chain wheel and said freewheeling hub of a respective one of said first and second side bicycles, where the pedalling power of said first and second side bicycles are transmitted by its respective gear control chains to said intermediate driving shaft through said freewheeling hubs respectively; (h) a drive chain linking said sprocket of said differential axle and said sprocket of said intermediate driving shaft, where the rotational power transmitted though said freewheeling hubs together drives said intermediate driving shaft, which in turn drives a propelling gear of said differential axle; (i) a unified braking system for simultaneously applying brakes on both said front wheels or both said rear wheels or all wheels of said first and second side bicycles so that said first and second side bicycles can be evenly braked to stop said four-wheel vehicle; and (j) means for securing and stabilizing the rears of said first and second side bicycles together; (k) whereby each individual pedal power is summed together and the total power is then transmitted to said intermediate driving shaft, which then transmits the summed power to said differential axle, which in turn evenly distributes the power to said rear wheels of said first and second side bicycles.

Defined even more broadly, the present invention is a pedal-powered four-wheel vehicle, comprising; (a) a first side bicycle and a second side bicycle attached in a side-by-side relationship, each bicycle having a frame member including a chain wheel, a crossbar, a steering post, a front fork for attaching a front wheel and a stay seat for attaching a rear wheel; (b) a handlebar securely attached to said steering post of said first side bicycle for steering said four-wheel vehicle; (c) a dummy handlebar clamped to said crossbar of said second side bicycle; (d) at least one front horizontal bar clamped to said crossbars of said first and second side bicycles for rigidly securing and stabilizing said first and second side bicycles together; (e) a steering system including a horizontal tie rod with two opposite ends, each coupled to a mounting plate which is clamped to a respective one of said steering posts of said first and second side bicycles for jointly operating both said steering posts; (f) a differential axle mounted between said first and second side bicycles and having a sprocket and two opposite ends which are coupled to rear wheel shafts of said first and second side bicycles through respective half-axles so that said rear wheels can rotate at different speeds; (g) an intermediate driving shaft mounted between said rear wheels of said first and second bicycles and located parallel and adjacent to said differential axle, the intermediate driving shaft having a sprocket and two opposite ends, each end having a freewheeling hub, where each freewheeling hub is supported by two support shafts extending from a respective one of said stay seats of said first and second side bicycles; (h) two gear control chains each linking said chain wheel and said freewheeling hub of a respective one of said first and second side bicycles, where the pedalling power of said first and second side bicycles are transmitted by its respective gear control chains to said intermediate driving shaft through said freewheeling hubs respectively; (i) a drive chain linking said sprocket of said differential axle and said sprocket of said intermediate driving shaft, where the rotational power transmitted though said freewheeling hubs together drives said intermediate driving shaft, which in turn drives a propelling gear of said differential axle; and (j) means for securing and stabilizing the rears of said first and second side bicycles together; (k) whereby each individual pedal power is summed together and the total power is then transmitted to said intermediate driving shaft, which then transmits the summed power to said differential axle, which in turn evenly distributes the power to said rear wheels of said first and second side bicycles.

Defined further more broadly, the present invention is a pedal-powered four-wheel vehicle, comprising: (a) two bicycles attached in a side-by-side relationship and each having a frame member including a chain wheel, a head tube, a crossbar, a down tube, a steering post, a front wheel and a rear wheel; (b) a differential axle mounted between said two bicycles coupled to rear wheel shafts of said two bicycles through respective half-axles so that said rear wheels can rotate at different speeds; (c) a speed control shaft mounted between said rear wheels of said two bicycles; (d) means for transmitting the pedalling power of each of said two bicycles to said speed control shaft; and (e) means for transmitting the rotation of said speed control shaft to said differential axle; (f) whereby each individual pedal power is summed together and the total power is then transmitted to said speed control shaft, which then transmits the summed power to said differential axle, which in turn evenly distributes the power to said rear wheels of said two bicycles.

Defined even further more broadly, the present invention is a pedal-powered four-wheel vehicle having two bicycles attached in a side-by-side relationship and utilizing a differential axle between their driving wheels to accommodate the speed difference thereof.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modifications in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A pedal-powered four-wheel vehicle, comprising:

a. a left side two-wheel bicycle and a right side two-wheel bicycle attached in a side-by-side relationship, each bicycle having a frame member including a chain wheel, a head tube, an incline crossbar, an incline down tube, a steering post, a front fork for attaching to a front wheel and a stay seat for attaching to a rear wheel;

b. a handlebar securely attached to said steering post of said left side bicycle for steering said four-wheel vehicle;

c. a dummy handlebar clamped on said incline crossbar of said right side bicycle;

d. an elongated upper front horizontal bar and an elongated lower front horizontal bar located adjacent and parallel to each other and respectively clamped between said incline crossbars and said incline down tubes of said left and right side bicycles for rigidly securing and stabilizing said left and right side bicycles together;

e. a steering system having an elongated horizontal tie rod with two opposite ends, each coupled to a mounting plate which is clamped to a respective one of said steering posts of said left and right side bicycles for jointly operating both said steering posts;

f. a differential axle mounted between said left and right side bicycles and having a central sprocket and two opposite ends which are coupled to rear wheel shafts of said left and right side bicycles through respective half-axles so that said rear wheels can rotate at different speeds;

g. an intermediate driving shaft mounted between said rear wheels of said left and right bicycles and located parallel and adjacent to said differential axle, the intermediate driving shaft having a central sprocket and two opposite ends, each end having a freewheel affixed to a speed control hub, where each speed control hub is supported by two support shafts extending from a respective one of said stay seats of said left and right side bicycles;

h. two gear control chains each linking said chain wheel and said freewheel of a respective one of said left and right bicycles, where an individual pedalling power of said left side bicycle and an individual pedalling power of said right side bicycle are transmitted by its respective gear control chains to said intermediate driving shaft through said freewheels respectively;

i. a drive chain linking said sprocket of said differential axle and said sprocket of said intermediate driving shaft, where a rotational power transmitted through said freewheels drives said intermediate driving shaft, which in turn drives a propelling gear of said differential axle;

j. a unified braking system for simultaneously applying brakes on at least two parallel ones of said wheels of said left and right side bicycles so that said left and right side bicycles can be evenly braked to stop said four-wheel vehicle; and k. an elongated cover member mounted between said left and right side bicycles for covering said differential axle and said intermediate driving shaft and further securing and stabilizing said left and right side bicycles together;

l. whereby said individual pedal powers are combined to transmit combined power to said intermediate driving shaft, which then transmits the combined power to said differential axle, which in turn evenly distributes the combined power to said rear wheels of said left and right side bicycles.

2. The invention as defined in claim 1 wherein said upper and lower front horizontal bars and said elongated cover member are configured for maintaining a stable side-by-side relationship.

3. The invention as defined in claim 1 wherein said right side two-wheel bicycle is a mirror image of said left side two-wheel bicycle.

4. The invention as defined in claim 1 wherein said left and right side two-wheel bicycles each further includes a shifter for changing speeds of said left and right side two-wheel bicycles.

5. The invention as defined in claim 1 further comprising two flexible couplings with one flexible coupling connected at opposite ends of said horizontal tie rod for allowing small amounts of parallel and angular movement.

6. The invention as defined in claim 1 further comprising two pairs of hinge couplings with one pair of hinge couplings connected at opposite ends of said upper and lower front horizontal bars respectively for allowing up and down movement of said left and right side two-wheel bicycles.

7. The invention as defined in claim 1 further comprising two pairs of universal couplings with one pair of universal couplings connected at opposite ends of said differential axle and at opposite ends of said intermediate driving shaft for allowing small amounts of parallel and angular movement.

8. A pedal-powered four-wheel vehicle, comprising;
   a. a first side bicycle and a second side bicycle attached in a side-by-side relationship, each bicycle having a frame member including a chain wheel, a crossbar, a steering post, a front fork for attaching a front wheel and a stay seat for attaching a rear wheel;
   b. a handlebar securely attached to said steering post of said first side bicycle for steering said four-wheel vehicle;
   c. a dummy handlebar clamped to said crossbar of said second side bicycle;
   d. at least one front horizontal bar clamped to said crossbars of said first and second side bicycles for rigidly securing and stabilizing said first and second side bicycles together;
   e. a steering system including a horizontal tie rod with two opposite ends, each coupled to a mounting plate which is clamped to a respective one of said steering posts of said first and second side bicycles for jointly operating both said steering posts;
   f. a differential axle mounted between said first and second side bicycles and having a sprocket and two opposite ends which are coupled to rear wheel shafts of said first and second side bicycles through respective half-axles so that said rear wheels can rotate at different speeds;
   g. an intermediate driving shaft mounted between said rear wheels of said first and second bicycles and located parallel and adjacent to said differential axle, the intermediate driving shaft having a sprocket and two opposite ends, each end having a freewheeling hub, where each freewheeling hub is supported by two support shafts extending from a respective one of said stay seats of said first and second side bicycles;
   h. two gear control chains each linking said chain wheel and said freewheeling hub of a respective one of said first and second side bicycles, where an individual pedalling power of said first side bicycle and an individual pedalling power of said second side bicycle are transmitted by its respective gear control chains to said intermediate driving shaft through said freewheeling hubs respectively;
   i. a drive chain linking said sprocket of said differential axle and said sprocket of said intermediate driving shaft, where a rotational power transmitted though said freewheeling hubs drives said intermediate driving shaft, which in turn drives a propelling gear of said differential axle;
   j. a unified braking system for simultaneously applying brakes on at least two parallel ones of said wheels of said first and second side bicycles so that said first and second side bicycles can be evenly braked to stop said four-wheel vehicle; and
   k. means for securing and stabilizing the rears of said first and second side bicycles together;
   l. whereby said individual pedal powers are combined to transmit combined power said intermediate driving shaft, which then transmits combined power to said differential axle, which in turn evenly distributes the combined power to said rear wheels of said first and second side bicycles.

9. The invention as defined in claim 8 wherein said at least one front horizontal bar is configured for maintaining a stable side-by-side relationship.

10. The invention as defined in claim 8 wherein said second side two-wheel bicycle is a mirror image of said first side two-wheel bicycle.

11. The invention as defined in claim 8 wherein said first and second side two-wheel bicycles each further includes a shifter for changing speeds of said first and second side two-wheel bicycles.

12. The invention as defined in claim 8 wherein said means for securing and stabilizing the rears of said first and second side bicycles together includes an elongated cover member mounted between said first and second side bicycles and further covering said differential axle and said intermediate driving shaft.

13. The invention as defined in claim 8 wherein said means for securing and stabilizing the rears of said first and second side bicycles together includes an elongated rear support bar mounted between said freewheeling hubs of said first and second side bicycles.

14. The invention as defined in claim 8 further comprising at least two flexible couplings with at least one flexible coupling connected at opposite ends of said horizontal tie rod for allowing small amounts of parallel and angular movement.

15. The invention as defined in claim 8 further comprising at least two hinge couplings with at least one hinge coupling connected at opposite ends of said at least one front horizontal bar for allowing up and down movement of said first and second side two-wheel bicycles.

16. The invention as defined in claim 8 further comprising at least two pairs of universal couplings with at least one pair of universal couplings connected at opposite ends of said differential axle and at opposite ends of said intermediate driving shaft for allowing small amounts of parallel and angular movement.

17. A pedal-powered four-wheel vehicle, comprising;
   a. a first side bicycle and a second side bicycle attached in a side-by-side relationship, each bicycle having a frame member including a chain wheel, a crossbar, a steering post, a front fork for attaching a front wheel and a stay seat for attaching a rear wheel;
   b. a handlebar securely attached to said steering post of said first side bicycle for steering said four-wheel vehicle;
   c. a dummy handlebar clamped to said crossbar of said second side bicycle;
   d. at least one front horizontal bar clamped to said crossbars of said first and second side bicycles for rigidly securing and stabilizing said first and second side bicycles together;
   e. a differential axle mounted between said first and second side bicycles and having a sprocket and two opposite ends which are coupled to rear wheel shafts of said first and second side bicycles through respective half-axles so that said rear wheels can rotate at different speeds;
   f. an intermediate driving shaft mounted between said rear wheels of said first and second bicycles and located parallel and adjacent to said differential axle, the intermediate driving shaft having a sprocket and two opposite ends, each end having a freewheeling hub, where each freewheeling hub is supported by two support shafts extending from a respective one of said stay seats of said first and second side bicycles;

g. two gear control chains each linking said chain wheel and said freewheeling hub of a respective one of said first and second side bicycles, where an individual pedalling power of said first side bicycle and an individual pedalling power of said second side bicycle are transmitted by its respective gear control chains to said intermediate driving shaft through said freewheeling hubs respectively;

h. a drive chain linking said sprocket of said differential axle and said sprocket of said intermediate driving shaft, where a rotational power transmitted though said freewheeling hubs drives said intermediate driving shaft, which in turn drives a propelling gear of said differential axle;

i. a unified braking system for evenly stopping said four-wheel vehicle; and j. means for securing and stabilizing the rears of said first and second side bicycles together;

k. whereby said individual pedal powers are combined to transmit combined power said intermediate driving shaft, which then transmits the combined power to said differential axle, which in turn evenly distributes the combined power to said rear wheels of said first and second side bicycles.

18. A pedal-powered four-wheel vehicle, comprising;

a. a first side bicycle and a second side bicycle attached in a side-by-side relationship, each bicycle having a frame member including a chain wheel, a crossbar, a steering post, a front fork for attaching a front wheel and a stay seat for attaching a rear wheel;

b. a handlebar securely attached to said steering post of said first side bicycle for steering said four-wheel vehicle;

c. a dummy handlebar clamped to said crossbar of said second side bicycle;

d. at least one front horizontal bar clamped to said crossbars of said first and second side bicycles for rigidly securing and stabilizing said first and second side bicycles together;

e. a steering system including a horizontal tie rod with two opposite ends, each coupled to a mounting plate which is clamped to a respective one of said steering posts of said first and second side bicycles for jointly operating both said steering posts;

f. a differential axle mounted between said first and second side bicycles and having a sprocket and two opposite ends which are coupled to rear wheel shafts of said first and second side bicycles through respective half-axles so that said rear wheels can rotate at different speeds;

g. an intermediate driving shaft mounted between said rear wheels of said first and second bicycles and located parallel and adjacent to said differential axle, the intermediate driving shaft having a sprocket and two opposite ends, each end having a freewheeling hub, where each freewheeling hub is supported by two support shafts extending from a respective one of said stay seats of said first and second side bicycles;

h. two gear control chains each linking said chain wheel and said freewheeling hub of a respective one of said first and second side bicycles, where an individual pedalling power of said first side bicycle and an individual pedalling power of said second side bicycle are transmitted by its respective gear control chains to said intermediate driving shaft through said freewheeling hubs respectively;

i. a drive chain linking said sprocket of said differential axle and said sprocket of said intermediate driving shaft, where a rotational power transmitted though said freewheeling hubs drives said intermediate driving shaft, which in turn drives a propelling gear of said differential axle; and j. means for securing and stabilizing the rears of said first and second side bicycles together;

k. whereby said individual pedal powers are combined to transmit combined power to said intermediate driving shaft, which then transmits the combined power to said differential axle, which in turn evenly distributes the combined power to said rear wheels of said first and second side bicycles.

19. A pedal-powered four-wheel vehicle, comprising:

a. two bicycles attached in a side-by-side relationship and each bicycle having a frame member including a front wheel and a rear wheel;

b. a differential axle mounted between said two bicycles and coupled to rear wheel shafts of said two bicycles through respective half-axles so that said rear wheels can rotate at different speeds;

c. a speed control shaft mounted between said rear wheels of said two bicycles;

d. means for transmitting an individual pedalling power of at least one of said two bicycles to said speed control shaft to rotate said speed control shaft; and e. means for transmitting the rotation of said speed control shaft to said differential axle;

f. whereby said individual pedalling power is transmitted to said speed control shaft and further is transmitted to said differential axle, which in turn evenly distributes said individual pedalling power to said rear wheels of said two bicycles.

20. The invention as defined in claim 19 further comprising a handlebar attached to a steering post of one of said two bicycles, and another handlebar attached to a crossbar of the another said two bicycles.

21. The invention as defined in claim 19 further comprising at least one horizontal bar clamped between said two bicycles for rigidly securing and stabilizing said two bicycles together.

22. The invention as defined in claim 21 wherein said at least one horizontal bar is configured for maintaining a stable side-by-side relationship.

23. The invention as defined in claim 22 further comprising at least two hinge couplings connected between said at least one horizontal bar.

24. The invention as defined in claim 19 further comprising a steering system having a horizontal tie rod coupled to a mounting plate at each end which is clamped to said two bicycles respectively.

25. The invention as defined in claim 24 further comprising at least two flexible couplings with at least one flexible coupling connected at opposite ends of said horizontal tie rod.

26. The invention as defined in claim 19 further comprising a unified braking system for simultaneously applying brakes on at least two parallel ones of said wheels of said two bicycles so that said two bicycles can be evenly braked to stop said four-wheel vehicle.

27. The invention as defined in claim 19 further comprising means for securing and stabilizing the rear of said two bicycles which includes an elongated cover member mounted between said two bicycles for covering said differential axle and said speed control shaft.

28. The invention as defined in claim 27 wherein said elongated cover member is configured for maintaining a stable side-by-side relationship.

29. The invention as defined in claim 19 further comprising means for securing and stabilizing the rear of said two bicycles which includes a rear support bar means mounted between said two bicycles.

30. The invention as defined in claim 29 wherein said rear support bar means is configured for maintaining a stable side-by-side relationship.

31. The invention as defined in claim 19 wherein said two bicycles are a mirror image of each other.

32. The invention as defined in claim 19 wherein said means for transmitting the pedalling power of each of said two bicycles to said speed control shaft includes two gear control chains and two freewheeling hubs.

33. The invention as defined in claim 19 wherein said means for transmitting the rotation of said speed control shaft to said differential axle includes a sprocket of said differential axle and a sprocket of said speed control shaft which are linked together by a drive chain.

34. The invention as defined in claim 19 wherein said two bicycles each further includes a shifter for changing speeds.

35. The invention as defined in claim 19 further comprising at least two pairs of universal couplings with at least one pair of universal couplings connected at opposite ends of said differential axle and at opposite ends of said speed control shaft.

36. A pedal-powered four-wheel vehicle having two bicycles attached in a side-by-side relationship, each bicycle having a driving wheel, and the bicycles including a single intermediate driving shaft extending therebetween and a differential axle coupled between the driving wheels to accommodate the speed difference thereof, where an individual pedalling power of each of the two bicycles is combined to transmit combined power to the intermediate driving shaft, which then transmits the combined power to the differential axle, which in turn evenly distributes the combined power to the driving wheels of the two bicycles respectively.

37. The invention as defined in claim 36 further comprising a speed control shaft mounted between said driving wheels of said two bicycles and means for transmitting the rotation of the speed control shaft to said differential axle.

38. The invention as defined in claim 36 further comprising a steering system having a horizontal tie rod coupled to a mounting plate at each end which is clamped to said two bicycles respectively.

39. The invention as defined in claim 36 further comprising a unified braking system for evenly stopping said four-wheel vehicle.

* * * * *